Patented Mar. 10, 1942

2,275,469

UNITED STATES PATENT OFFICE 2,275,469

RUBBER CHLORINATION

James Wallace Raynolds and George Arthur Webb, Pittsburgh, Pa., assignors to The Raolin Corporation, Charleston, W. Va., a corporation of West Virginia No Drawing. Application May 27, 1939, Serial No. 276,130

6 Claims. (Cl. 260—772)

This invention relates to rubber chlorination; and it comprises an improved process of making rubber chloride, and especially rubber chloride of high chlorine content and stable properties, wherein rubber in substantially anhydrous solution is chlorinated by contacting it with chlorine in the presence of surfaces of metallic copper, the copper serving both to catalyze and expedite chlorination to a product of higher chlorine content, the percentage of chlorine fixed in useful form being greater than with a given amount of chlorine supplied in the absence of copper; all as more fully hereinafter set forth and as claimed.

This application contains certain matter in common with a prior and copending application Serial No. 245,293, filed December 12, 1938, and is a continuation-in-part thereof.

It has been known for some time that various useful reaction products of chlorine and rubber, known generally as rubber chlorides or chlorinated rubbers, of somewhat varied properties, can be prepared under various conditions. The quality of the product as regards stability and some other important properties, varies somewhat with conditions of operation. Sometimes rubber is chlorinated in the solid state and sometimes when dissolved in various organic solvents. In the acknowledged application 245,293, there is described an advantageous process of chlorinating rubber; and an earlier form of a similar process is described in the North Patent 2,148,830.

In a general way, in the past no importance has been attached to the necessity for absolute dryness of the system during chlorination. In this acknowledged process, a dilute solution of rubber in a chlorine-resistant solvent, such as carbon tetrachloride, is first prepared, and this solution is boiled under reflux for several hours to reduce its viscosity and to eliminate water. The solution generally contains less than 5 per cent of rubber, and concentrations of about 1 to 3 per cent are most suitable for commercial operations. Boiling such solutions for several hours under reflux reduces the viscosity of the solutions to such an extent that they may be readily chlorinated without gelling. Another important result of the boiling is that any water coming into the system with the rubber or the solvent is eliminated by azeotropic distillation, escaping past the condenser. This water usually amounts to about 3 to 10 grams per pound of rubber, when using pale crepe rubber as the starting material.

After dehydrating and reducing the viscosity of the solution by boiling, the rubber solution (or "rubber cement") is chlorinated by bubbling gaseous chlorine through the liquid. This reaction is ordinarily conducted in a glass lined vessel to avoid contamination of the product. It has also been proposed heretofore to continuously withdraw solution from the vessel and recirculate it through a pipe or other passage back to the chlorinating vessel. This agitates the solution and helps to keep the rubber uniformly dispersed, and it prevents local overheating, and coating of the walls of the vessel. It also makes it simpler to irradiate the solution during chlorination. For example, a quartz window or Pyrex glass tube is often provided in the circulatory system, and the solution passing this window is exposed to the radiation from an ultraviolet lamp. This accelerates the chlorination, and makes it easier to obtain a chlorinated product of high chlorine content. High percentages of fixed chlorine in the product are considered desirable for many purposes.

The rubber chloride is recovered from this solution, sometimes after purification, by precipitation with a non-solvent such as water, alcohol, or a petroleum fraction. Various methods of precipitation are known to the art, and some are disclosed in detail elsewhere.

In the best of the rubber chlorinating procedures known prior to our invention, difficulties have sometimes been encountered in producing chlorinated rubber containing more than about 60 to 63 per cent chlorine; and these difficulties tend to increase as the chlorine content of the product increases. Reaction slows down. It was often found that chlorination to a product containing more than 63 per cent chlorine required an unduly long time. It is, however, very desirable to obtain chlorinated rubber having at least 65 per cent chlorine content and do it within a reasonable time.

We have now discovered that the chlorinating reaction is accelerated, and that the percentage of chlorine in the product can be rapidly increased to a maximum, if the rubber solution is reacted with chlorine in the presence of surfaces of metallic copper. This copper may be in finely divided form, but subdivision of the copper is unnecessary. Copper may be used in the form of a copper pipe, as for example, that through which chlorine gas in introduced into the rubber solution. In addition to, or as an alternative to, the copper inlet pipe, the recirculating system for the solution can be constructed of copper. The use of metallic copper or any other metal in contact with the reactants during rubber chlorination has always been avoided. This was because HCl is one product of the action and in a system having any moisture in it this HCl is corrosive. With a chlorinating system containing any moisture and in contact with metals, the product will be contaminated with chlorides. We have, however, discovered that with a wholly anhydrous system there is no danger of corrosion of metallic copper nor is there contamination of the product by copper chloride.

Under the present invention it is found that the presence of copper during chlorination expedites the reaction and increases the chlorine content of the product. These improvements are obtained without any other substantial effect on the routine of the process, or on the characteristics of the product. In chlorinating rubber it is customary to use more chlorine than is required, the excess being subsequently boiled off. Under the present invention the unused chlorine is less in amount. The resulting savings in time and chlorine are of considerable importance, especially in commercial operations. The results obtained by operating in accordance with this invention are illustrated in the following tests:

I (a) A carbon tetrachloride solution containing 1 per cent of rubber was charged into a chlorinating vessel of glass capable of transmitting some ultra-violet radiation. The weight of solution was 4700 grams, containing 47 grams rubber, and during a two hours period 145 grams of chlorine gas were introduced into the solution through a glass pipe. During this operation the temperature rose from 27° C. to 74.5° C., first because of the exothermic reaction and then because of heat applied during the last hour. During the introduction of chlorine, the entire upper surface of the vessel was irradiated with ultra-violet light. The chlorinated rubber was precipitated from solution, and analyzed. It contained 63.09 per cent chlorine, although the amount of chlorine added was approximately 12 per cent in excess of the amount theoretically required to produce rubber heptachloride containing 65.13 per cent chlorine. The final product had a viscosity of 216 cps., based on a 20 per cent solution in toluol measured on a Stormer viscometer at 25° C.

(b) For comparison, the same apparatus was again charged with 4700 grams of the same rubber cement. A copper pipe was substituted for the glass pipe previously employed to introduce the chlorine gas below the surface of the liquid. 147 grams of chlorine were introduced during a two hour period, and the temperature rose from 28° C. to 74.5° C., heat being applied during the last hour as before. During the introduction of the gas, the surface of the vessel was irradiated as before. The final product had a chlorine analysis of 66.13 per cent chlorine, and a 20 per cent solution in toluol had a viscosity of 144 cps. measured on a Stormer viscometer at 25° C.

This clearly shows that the final stages of chlorination are facilitated by the presence of copper in the system. The viscosity characteristics of the final chlorinated rubber solution are reduced by chlorinating in the presence of copper, but this effect is due principally to the lower viscosity of the more highly chlorinated product. The reasons for the beneficial actions of copper are not known. The copper may have a dispersing or disaggregating effect upon the rubber solution, which may account for the improvement in the reaction resulting from its presence. On the other hand, it has been found that with metallic copper present in the system the final viscosity of the chlorinated rubber products may be varied at will while keeping the chlorine percentage constant. Thus products having chlorine contents between 65 and 66 per cent can be prepared by this method with viscosities from 20 cps. to 2000 cps. or more.

II

Thirty gallons of a rubber cement containing 1 per cent of rubber dissolved in carbon tetrachloride and dehydrated by boiling under reflux for seven hours were charged into a glass lined chlorinating vessel. This vessel was provided with a copper inlet pipe for chlorine, and had a recirculating system constructed of copper pipe leading from the bottom of a vessel to a pump and from the pump back to the top of the vessel. An eighteen inch section of Pyrex glass tubing was inserted in the return line, and the solution was irradiated through this tubing with an ultra-violet lamp, during chlorination. Chlorine was introduced into the solution over a two and one-half hour period at an average rate of six pounds per hour (fifteen pounds chlorine in all). The temperature rose from 28° C. to 74° C., heat being applied during the last hour. The rubber chloride was precipitated from the solution with methanol, washed and dried, and analyzed. It showed a chlorine content of 67.3 per cent.

In similar operations in which no copper was present in the system, chlorination under similar conditions for a similar period ordinarily produced a product containing only about 63 per cent chlorine; and it ordinarily required at least five hours under these conditions to produce a product containing over 66 per cent chlorine.

III

The chlorinating vessel described in the preceding example was charged with 35 gallons of dehydrated rubber cement containing 1.43 per cent rubber (by weight) dissolved in carbon tetrachloride. 22.3 pounds of chlorine were added in two hours and eight minutes, this being approximately 5 per cent in excess of the amount theoretically required for chlorination to 65.13 per cent chlorine. The final product contained 65.73 per cent chlorine.

To obtain a chlorinated product of this chlorine content before the introduction of copper into the apparatus, an excess of at least 10 to 15 per cent chlorine, and a much longer time, were required.

The results obtained in the operation of rubber chlorinating processes, as described above, make it apparent that the presence of copper in a rubber chlorinating system makes possible the attainment of chlorine contents of 65 per cent and over in much less time, and with less excess chlorine, than is required in the absence of copper. A rubber cement can be quite readily chlorinated to a chlorine content of about 63 per cent in the usual ways, but it is difficult to raise the chlorine content from 63 per cent to 65 per cent or more. The presence of copper is especially beneficial in the attainment of this higher chlorine content. And this is important, since it is essential to the stability of rubber chloride under many service conditions that it contain 65 per cent or more chlorine. Products containing less than 65 per cent chlorine have less stability, and the stability decreases as the chlorine content is reduced. For example, chlorinated rubber containing 63 per cent chlorine is unstable at temperatures as low as 100° C., whereas the product containing 65 per cent chlorine is stable at temperatures up to 150° C. or higher. The use of copper in accordance with this invention greatly facilitates the attainment of these desirable higher chlorine contents.

What we claim is:

1. The method of chlorinating rubber, which comprises reacting gaseous chlorine with rubber dispersed in dilute anhydrous solution, while said solution is in contact with metallic copper.

2. The method of making chlorinated rubber, which comprises dissolving rubber in a chlorine-resistant, non-aqueous solvent therefor, dehydrating the resulting rubber solution, and introducing chlorine into the substantially anhydrous rubber solution while said solution is in contact with metallic copper.

3. The method of claim 2, wherein the said rubber solution is dehydrated, and its viscosity is reduced prior to chlorination, by prolonged boiling under reflux.

4. The method of claim 2, wherein the chlorine is introduced into the rubber solution through a conduit comprising copper in contact with said solution.

5. The method of claim 2, wherein a body of said anhydrous rubber solution and introduced chlorine is established, and a portion of the body is withdrawn and circulated through a passage and back to said body, and wherein said portion is contacted with metallic copper during the circulation thereof.

6. A method of making rubber chloride solutions of high chlorine content and controlled viscosity, which comprises introducing chlorine into an anhydrous solution of rubber which is in contact with metallic copper until rubber chloride containing at least 65 per cent of chlorine is formed in the solution.

JAMES WALLACE RAYNOLDS.
GEORGE ARTHUR WEBB.